United States Patent [19]

Hoffmann

[11] 4,056,987
[45] Nov. 8, 1977

[54] MECHANISM FOR PARALLEL CONNECTION OF INFINITELY-ADJUSTABLE LOOPING GEARINGS

[76] Inventor: Georges Hoffmann, 35, rue des Roses, Luxembourg-Ville, Luxembourg

[21] Appl. No.: 632,830

[22] Filed: Nov. 17, 1975

[30] Foreign Application Priority Data

Nov. 20, 1974 Luxembourg .................. 71316
Aug. 26, 1975 Luxembourg .................. 73259

[51] Int. Cl.² ............... F16H 37/06; F16H 37/08
[52] U.S. Cl. .................. 74/689; 74/230.17 A
[58] Field of Search ........ 74/689, 700, 701, 230.17 A, 74/665 GE

[56] References Cited

U.S. PATENT DOCUMENTS

| | | | |
|---|---|---|---|
| 1,727,232 | 9/1929 | Farrell | 74/689 |
| 2,158,047 | 5/1939 | Weston | 74/230.17 A |
| 2,218,712 | 10/1940 | Johnson | 74/689 |
| 2,410,915 | 11/1946 | Willmott | 74/689 |
| 2,738,688 | 3/1956 | Shaw | 74/689 |
| 2,770,978 | 11/1956 | Troemel | 74/230.17 A |
| 2,831,358 | 4/1958 | Michie | 74/230.17 A |
| 2,927,470 | 3/1960 | Heyer | 74/230.17 A |
| 3,088,326 | 5/1963 | Woodward | 74/230.17 A |

Primary Examiner—Samuel Scott
Assistant Examiner—Allan R. Burke
Attorney, Agent, or Firm—Holman & Stern

[57] ABSTRACT

A mechanism for the parallel connection of infinitely-adjustable looping gearings having planetary and/or differential gearings interconnected with the displaceable pulley halves and control threads that automatically adjust running differences between the different V-belt pulleys as well as providing a means for simultaneously changing the transmission ratio of several coaxially-mounted V-belt pulleys.

11 Claims, 2 Drawing Figures

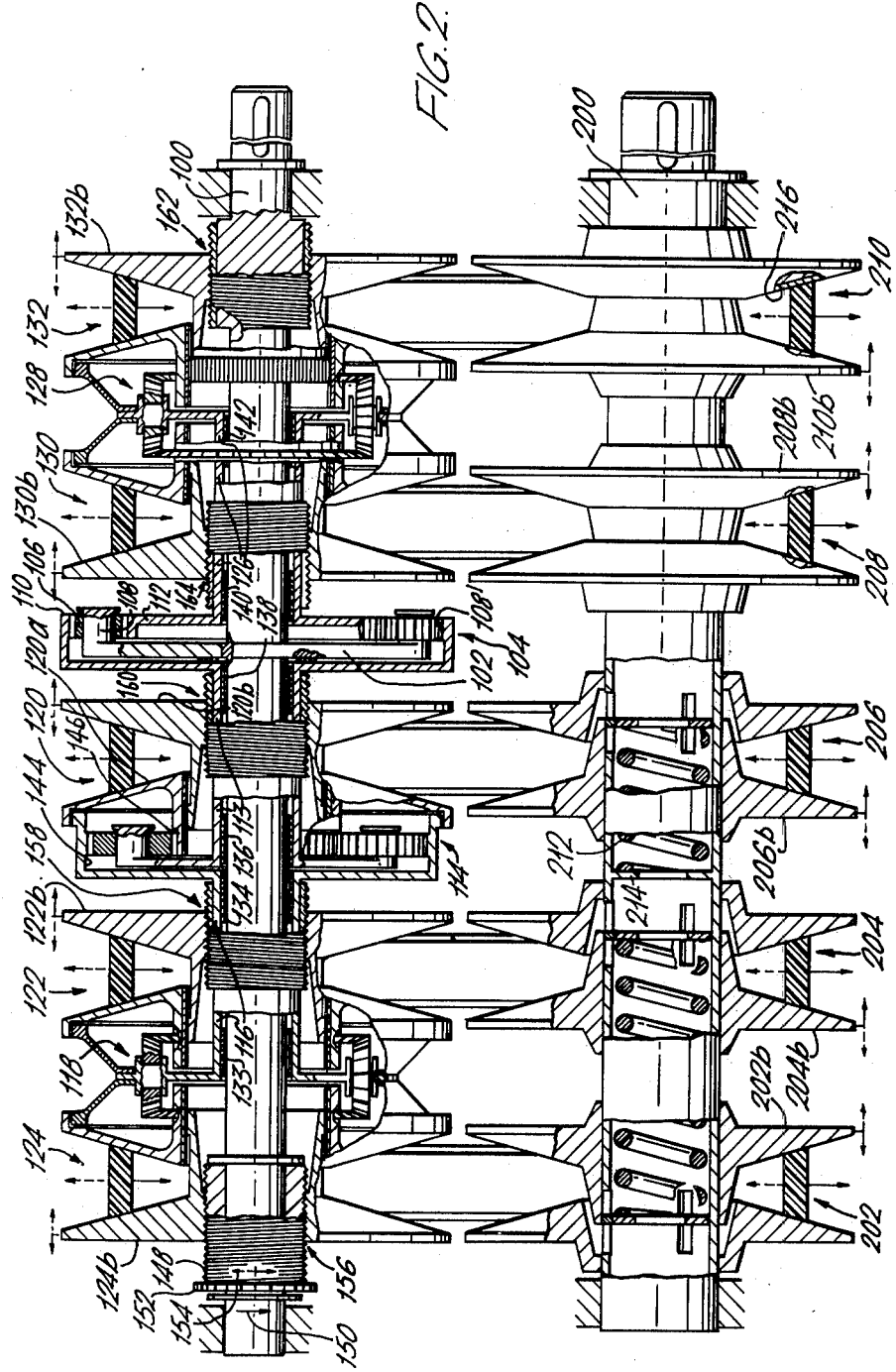

MECHANISM FOR PARALLEL CONNECTION OF INFINITELY-ADJUSTABLE LOOPING GEARINGS

BACKGROUND OF THE INVENTION

The present invention relates to a parallel connection of infinitely-adjustable looping gearings, with at least two belt pulleys mounted axially side by side on a driving or driven shaft.

If a number of infinitely-adjustable looping gearings, in particular stepless V-belt gearings, are operating in parallel, in order to increase the transmissible power, then the problem arises of maintaining an equal transmission ratio between all the individual gearings in order to avoid incorrect differences of tension between the different V-belts. This problem of ensuring indentical transmission ratios can be avoided, for example, if the driving pulleys for the V-belts are driven via differential or planetary gearings. It is permissible for the pulleys driven by these latter to rotate at different speeds, so that despite not exactly identical transmission ratios in the sets of pulleys operating in parallel no undesirable tension differences will occur between the different V-belts.

It is true that this use of differential or planetary gearings ensures more or less faultless operation of the V-belt gearings operating in parallel, but since these differential or planetary gearings, in the systems hitherto known, have to run in an oil bath, it necessitates at least one oil-tight housing, so that it is only at considerable cost that it is possible to construct a functional and compact combination of such differential gearings with belt gearings that operate dry. Furthermore, the overall efficiency of such a combination is reduced by the power losses ocurring in the differential gearings used.

For the avoidance of undesirable tension differences between the different belts of a parallel gearing, the prior art includes a fundamentally different solution in which the differences between the torques which are transmitted by the individual sets of pulleys are utilized by means of suitable mechanisms for correcting the belt running gap width between the sets of pulleys. Constructional solutions according to this principle are based on the utilization for regulating purposes, for example, of the axial thrust occurring in the individual pulleys, on the assumption that this axial thrust is in exact proportion to the torque transmitted. Devices of this kind are already known from U.S. Pat. No. 2,158,047 and German Pat. No. 1,042,332. The sphere of application for these solutions is thus limited to stepless looping gearings, in which the said assumption is in actual fact correct.

The two aforementioned systems devised for the avoidance of incorrect belt tension differences in parallel gearings, i.e., the use of differential gearings in accordance with the prior art and also the utilization of torque differences for regulating purposes, are found to suffer in common from the drawback that in each of these load distribution devices according to the prior art, it is necessary for a control rod system, for example, to act on each of the controlled halves of the pulleys, so that the operation of a large number of sets of pulleys in parallel leads to the creation of a complicated control mechanism, by which the space occupied by a gearing of this kind is increased to an undesirable extent. This also applies, moreover, to a stepless V-belt gearing which has become known in the motor car industry and in which the transmission ratio is controlled by centrifugal weights and vacuum cylinders.

OBJECTS AND SUMMARY OF THE INVENTION

The purpose of the invention is to provide an apparatus for the parallel connection of a number of looping gearings, particularly V-belt gearings, with stepless control of the transmission ratio, the said apparatus ensuring an equal transmission ratio in all the sets of pulleys present and enabling the aforementioned drawbacks and defects of the prior art to be prevented or largely eliminated.

The invention enables this object to be achieved as a result of the fact that each belt pulley has at least one axially displaceable half which determines the effective pulley diameter, an equalizing mechanism being provided, as a result of which at least one displaceable half of the pulley is automatically displaced in order to nullify any asynchronism occurring in the running of the different pulleys, while a control mechanism is provided as a result of which at least one displaceable pulley half is positively actuated in order to set up a certain transmission ratio desired.

The equalizing mechanisms according to the invention consists of differential or planetary gearings coaxial with a driving or driven shaft and of pairings of screw threads for kinetic purposes between the displaceable pulley halves and the shafts or control devices associated with them, the said motional threading pairings displacing the pulley halves whenever the different belt pulleys commence to turn at different speeds from one another.

BRIEF DESCRIPTION OF THE DRAWINGS

Examples of the invention are shown in the drawings and are described hereinafter in greater detail. The diagrams are as follows:

FIG. 2: is a longitudinal section through a quintuple gearing according to the invention.

DETAILED DESCRIPTION OF PREFERRED EMBODIMENTS

Figure 1:
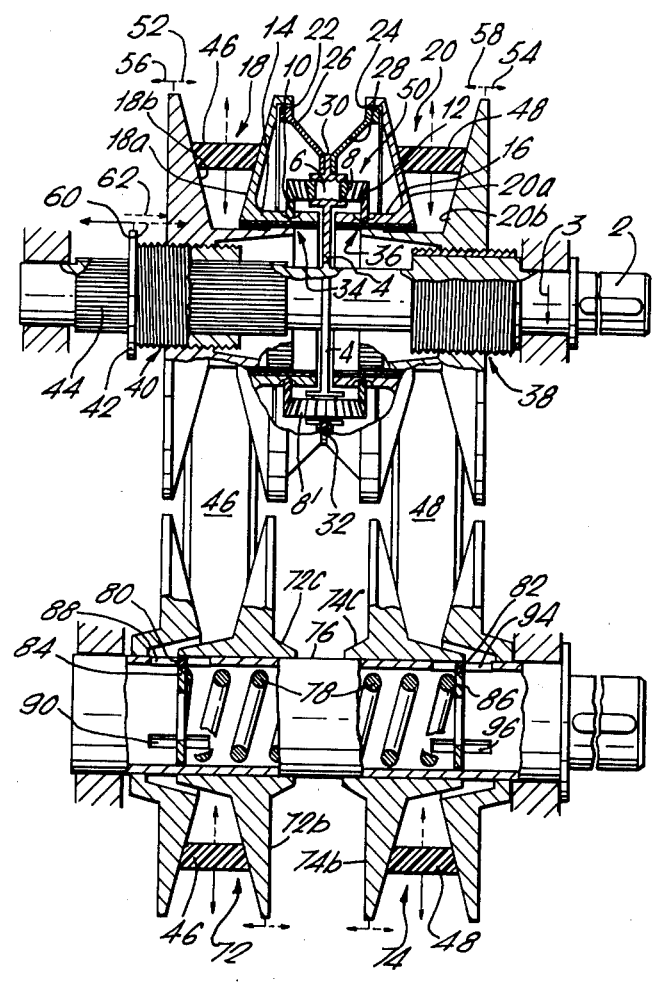
FIG. 1: is a longitudinal section through a double gearing according to the invention.

A planet gear carrier 4, provided with shaft journals 6, on which planet bevel gears 8 and 8' are to be mounted rotatably, is torsionally connected to a shaft 2 (FIG. 1) which, for the sake of simplicity, may be regarded as a primary shaft, i.e., as the driving shaft of a stepless double gearing shown in the drawing. On the principle already known in the car industry these planet gears, with the driving bevel gears 10 and 12 associated with them, constitute an entrainment connection which enables differential speeds of rotation to take place on the shafts or similar devices driven by the wheels 10 and 12 and which in the present case is termed a differential gearing 50. According to the invention, these driving bevel gears 10 and 12 are situated on hubs 14 and 16 of V-belt pulley halves 18a and 20a which, in the invention, are rotatably mounted, at their periphery 22 and 24, on substantially frustum-shaped rings 26 and 28. These rings 26 and 28, in their turn, form in conjunction with radial extensions 30 and 32 of the shaft journals 6 and thus of the planet gear carrier 4 a mechanical unit with the shaft 2, so that the pulley halves 18a and 20a, with the interposition of the rings 26 and 28, of the radial extensions 30 and 32 of the shaft journals 6 and of the planet gear carrier 4, are mounted so as to be rotatable in relation to the shaft 2. One pulley half 18b is mounted non-rotatably, e.g., by means of a serration 34, but in an axially displaceable manner, on the hub 14 of the axially rigid pulley half 18a, with which latter it forms the V-belt pulley 18, a pulley half 20b being mounted on the same principle on the pulley half 20a, with which it forms the V-belt pulley 20.

On the other hand, the pulley half 20b is mounted via a left-hand motional threading 38 on the shaft 2, whereas the pulley 18b is mounted via a right-hand motional threading 40 on a control sleeve 42 which in its turn is mounted non-rotatably but nevertheless displaceable in the axial direction, e.g., by means of a serration 44, on the shaft 2.

V-belts 46 and 48 transmit the power via pulleys 72 and 74 of which the axially movable pulley halves 72b and 74b are spring loaded, to the secondary shaft 76 of the gearing, the invention only providing for one single pressure spring 78 which is situated inside the shaft 76 and which rests by one end against the pulley half 72b and by the other against the pulley half 74b. This supporting action is provided by means of extensions 80 and 82 pointing radially inwards and belonging to the pulley hubs 72c and 74c and by spring supporting rings 84 and 86, the said extensions 80 and 82 passing through slits 88, 90, 94 and 96 of the hollow shaft 76. In general, for each pulley half axially movable on the shaft 76, three slits will be provided, these being evenly distributed over the periphery of the said shaft 76. The radial extensions 80 and 82 form, on the one hand with the hubs 72c and 74c and on the other hand with the spring supporting rings 84 and 86, a rigidly connected unit, and can at the same time function as an entrainment connection between the pulley halves 72b and 74b and the shaft 76. The type of entrainment connection to be preferred is naturally a serration (not shown in the drawing) between the hubs 72c and 74c and the shafts 76.

The concrete form taken by the basic principle of the present invention consists of the combination of the differential gearing 50 with the pairings 38, 40 of motional threads, the interaction of the equalising gearing 50 with these motional threading pairings resulting in a constructionally integrated regulating system.

This regulating system functions as follows:

If the primary shaft 2 is driven, for example, by an electric motor (not shown in the drawing) in the direction of rotation 3, then the driving entrainment of the pulleys 18 and 20 is effected by the differential gearing 50, by which the torque supplied to the shaft 2 is distributed in the known manner and in exactly equal parts to the said two pulleys 18 and 20. As these latter are able to perform rotations in relation to the shaft 2, no undesirable difference of tension can take place between the belts 46 and 48.

If the transmission ratio between the set of pulleys 18/72 on the one hand and between the set of pulleys 20/74 on the other is exactly equal, then the differential 50 coaxial with the shaft 2 functions purely as an entrainment device, in which case the planet gears 8 and 8' perform no rotation about their axis and thus likewise do not differentially move the bevel gearings 10 and 12 associated with them. Similarly, the pulleys 18 and 20 will then perform no rotatory movement in relation to the shaft 2 or in relation to their mounting system 22, 24 and 38, 40, respectively.

If, however, the transmission ratio between the set of pulleys 18/72 on the one hand and the set of pulleys 20/74 on the other is altered owing to some fault, e.g., because the belt 46, for some reason, decreases more rapidly in width in the course of the operating period than the belt 48, then the pulley 18 will tend to advance in relation to the shaft 2, while the pulley 20, as the two pulleys are interconnected via the differential 50, will tend to lag in relation to the said shaft 2. Owing to this advance and lag of the pulleys 18 and 20 respectively, however, the motional threading pairings 38 and 40 come into operation, and in such a manner, as will be seen from a comparison of the direction of rotation 3 of the shaft 2 with the direction of pitch of the threading 38 (left-handed) and the threading 40 (right-handed), that the pulley half 18b is displaced in the direction causing a reduction in the running gap of the pulley 18 (direction 52), whereas the pulley half 20b is displaced in the direction causing a widening of the running gap (direction 54) of the pulley 20. The transmission ratios are thus continuously corrected, so that the gear wheels 8, 8' and 10, 12, for example, only differentially move with respect to one another, as it were, so that the planet gears 8 and 8' will likewise only perform a virtual rotation about their own axis and the pulleys 18 and 20 will similarly only perform virtual rotatory movements in relation to their respective mounting systems. It will be clear that these gear wheels and mounting systems require no regular lubrication and that, on the contrary, it will be completely sufficient for them to be constructed wholly or partly of abrasion-proof material ensuring an easy sliding movement, such as polyamide or tetrafluoroethylene.

The transmission ratio regulating system according to the invention, which ensures continuous synchronisation of the pulleys 18 and 20, thus not only makes it possible to dispense with the otherwise necessary oil lubrication and thus to avoid the sealing problems attendant thereon but also prevents the occurrence of any power losses due to the presence of the differential 50, since the latter, of course, is only virtually operative as an actual differential gearing.

A further very significant advantage offered by the regulating system according to the invention resides in the fact that it opens up the possibility of altering the command variable, i.e., to operate at some new transmission ratio of the whole looping gearing by optionally controlling only one of the pulleys operated in parallel. FIG. 1 shows a concrete form which may be taken by this aspect of the invention, a control sleeve 42 being provided for the axially-displaceable pulley half 18b only. If some new transmission ratio is to be produced, then assuming a constant rotation speed for the shaft 2 (in the direction of rotation 3), for the sake of simplicity, the control sleeve 42 will be displaced, for example, in the direction shown by the arrow 60, i.e., in the direction required for a reduction in the running gap of the pulley 18, as a result of which the belt 46 will travel towards the outside on this pulley, while moving inwards on the counter-pulley 72. The said counter-pulley 72, however, is connected with the adjacent pulley 74 in such a way that it cannot rotate in relation thereto and will thus automatically at all times move synchronously with the latter pulley, so that it will not immediately rotate at a higher speed, when the said travel of the belt takes place, but will, on the contrary, first of all brake the pulley 18, this latter then lagging in respect of the shaft 2. This lag of the pulley 18, however, causes the pulley 20 to advance in respect of the shaft 2, since they are interconnected via the equalising gearing 50, and the pulley half 20b will thus be displaced, by the motional threading pairing 38 now becoming operative, in the direction shown by the arrow 58, i.e., in that required for a reduction in the running gap of the pulley 20. On the other hand, owing to the lag of the pulley 18 in relation to the shaft 2, the motional threading pairing 40 likewise comes into operation, causing a displacement of the pulley half 18b in the direction required for a running gap increase 56 for the pulley 18, i.e., in the direction opposite to the direction of movement 60 of the control sleeve 42. The pulley half 18b is thus displaced by the sleeve 42 in the direction shown by the arrow 52 but is at the same time displaced, by the regulating system according to the invention, in the direction shown by the arrow 56. On simple consideration of the matter it will be seen that the resultant control stroke becoming operative on the pulley half 18b, as a result of these two opposite axial movements, amounts to half the control stroke 60 effected on the sleeve 42. The axial stroke 58 on the pulley half 20b likewise amounts to one half of the control sleeve stroke. A given control stroke of the sleeve 42 will thus be distributed in equal parts over the pulleys present.

After the completion of the control movement in the sleeve 42 the two belt pulleys 18 and 20 once again run synchronously with the shaft 2 and the rotation of the planet gears 8 and 8' about their axis, comes to a stop.

Thus, although the operation of setting a new transmission ratio is accompanied by relative movements between the gearing component associated with the shaft 2, such as the meshing of the differential gear wheels and the sliding of the pulleys in their mounting, this in no way necessitates lubrication of the parts in question, since these latter, as mentioned farther back, are wholly or partly manufactured from polyamide or similar materials and thus stand up to these purely temporary and sporadic sliding movements without presenting any problem.

In a simpler embodiment (not shown in the drawing) of the gearing according to the invention, the control sleeve 42, the motional threading pairing 40 and the serration 44 are dispensed with. The pulley half 18b is then mounted on the actual shaft 2 (not shown in the drawing) in a rotatable and axial displaceable manner. A control mechanism (not shown) then acts on the actual pulley half 1b, as indicated by the arrow 62, instead of acting on a control sleeve. In this simplified version of the transmission regulating system, however, a slight difference of load between the two belts has to be accepted, this difference depending on the pitch of the only pair of threadings still provided for kinetic purposes in this embodiment, i.e., the motional threading pairing 38.

FIG. 2 shows the apparatus according to the invention, enabling any desired number of sets of pulleys, in the present case five, to operate in parallel, without any incorrect tension differences occurring between the various V-belts.

With a primary shaft 100 (FIG. 2) the planet gear carrier 102 of a primary planet gearing 104 forms a mechanical unit. Planetary spur gears 108 and 108' are rotatably mounted on the shaft journal 106 to the planet gear carrier 102 and engage on the one hand with a hollow wheel 110 and on the other hand with a sun wheel 112. The hollow wheel 110 drives a secondary planet gearing 114 via a hollow shaft 113 and a tertiary differential 118 via a hollow shaft 116, and thus adjustable V-belt pulleys 120, 122 and 124, while the sun wheel 112 drives a secondary differential 128 and thus adjustable V-belt pulleys 130 and 132 via a hollow shaft 126. As may be seen, all the planet gearings and differentials, with their respective V-belt pulleys and hollow shafts, are mounted coaxially with the primary shaft 100, the hollow shafts being rotatably mounted on the shaft 100, preferably by means of plastic bearing bushings 133, 134, 136, 138, 140 and 142.

As the hollow shaft 110 has to drive a total of three belt pulleys and the sun wheel 112 a total of two belt pulleys, the selected ratio between the respective pitch diameters of these two gear wheels is 3:2. The hollow shaft 113 thus receives three-fifths and the hollow shaft 126 two-fifths of the torque supplied by the shaft 100.

The hollow shaft 144 of the secondary planet gearing 114 has to drive two pulleys 122 and 124, while the sun wheel 146 of this planetary gearing forms a mechanical unit in conjunction with the hub of the axially fixed pulley half 120a of the pulley 120, the said sun wheel 146 thus only having to drive this one pulley 120. In order to ensure that the torque supplied by the hollow shaft 113 will be evenly distributed over the pulleys 122, 124 and 120, the ratio selected between the respective pitch diameters of the hollow wheel 144 and the sun wheel 146 must be two to one (2:1).

To enable the desired transmission ratio to be produced between the primary shaft 100 and a secondary shaft 200, a control sleeve 148 is provided, which in the present example is mounted rotatably but axially non-displaceably on the shaft 100. When the gearing has been set to a certain transmission ratio, the said control sleeve 148 will rotate at the same speed and in the same direction as the shaft 100 (direction of rotation 150). If, however, the transmission ratio of this gearing is to be changed, then a rotation relative to the shaft 100 will be temporarily imparted to the control sleeve 148, preferably by means of a toothed-belt gearing 152. This relative rotatory movement can be imparted to the sleeve by means of some such device as that which has become known, for example, from U.S. Pat. No. 2,158,047.

As may be seen, the spring loaded pulleys 202, 204, 206, 208 and 210 are in this case likewise mounted on the one common secondary hollow shaft 200 in such a way that they cannot rotate in relation to the latter, so that they will automatically run synchronously at all times. For the sake of simplicity the two pulleys 208 and 210 are shown in elevation, their structure being in all respects identical with that of the pulleys 202 and 204. The pulley halves 202b, 204b, and 208b 210b, are each subjected to the action of one spring only, on the same principle as the example shown in FIG. 1, while the pulley half 206b is subjected to the action of a separate spring 212 which rests against a radial projection 214 of the hollow shaft 200.

If the transmission ratio of the gearing is to be changed, then the control sleeve 148 is rotated in relation to the primary shaft 100, in which connection it is once again assumed that the rotation speed of the said shaft 100 is constant. If the rotation is effected in the direction shown by the arrow 154, for instance, then all the belts will simultaneously travel towards the outside, on the pulleys associated with the primary shaft 100, and travel inwards on the pulleys associated with the secondary shaft 200. In order, however, to describe more clearly the cycle of movements taking place inside the gearing, it will be assumed, for the sake of simplicity, that they take place in succession to one another instead of simultaneously.

In view of the right-handed motional threading pairing 156 the rotation of the control sleeve 148 in the direction shown by the arrow 154 causes the belt run gap of the pulley 124 to narrow, the pulley thus being braked by its counter pulley 202 and therefore lagging behind the pulley 122. As the pulley last mentioned is connected via the differential 118 with the pulley 124, the lagging of this latter causes the pulley 122 to advance in relation to the hollow shaft 116, as a result of which the left-handed motional threading pairing 158 becomes effective and the pulley half 122b is likewise displaced in the direction required to reduce the running gap of the pulley 122, as a result of which this latter is now likewise braked by its counter-pulley. These movements, however, are now accompanied by a lag of the differential 118, the hollow shaft 116 and the hollow wheel 144 in relation to the pulley 120, which once again implies an advance of this latter pulley in relation to the hollow shaft 113, as a result of which the pulley half 120b, owing to the effect of the left-handed motional threading pairing 160, is now also displaced in the direction required for a reduction in the running gap of the pulley 120, which leads, in its turn, to the braking of this latter pulley. The planetary gearing 114, together with the hollow shaft 113 and the hollow wheel 110, now likewise lags behind the shaft 100, which action, owing to the presence of the planetary gearing 104, involves the advance of the hollow shaft 126 and the differential 128 in relation to the said shaft 100. The advance of the differential 128, however, also involves the advance of the pulley 132 in relation to the said shaft 100, and this owing to the effect of the left-handed motional threading pairing 162, results in a reduction in the running gap of the said pulley 132, as a result of which it then lags behind the pulley 130. Finally, owing to the action of the differential 128 and of the right-handed motional threading pairing 164, the pulley 130 is likewise displaced in the direction required for the narrowing of the running gap.

After the processes described, which in reality take place simultaneously, as already mentioned, have taken place, equal transmission ratios once again prevail between the five sets of pulleys, and the five pulleys 120, 122, 124, 130 and 132 are again rotating synchronously both with one another and with the shaft 100. It is only the over-all transmission ratio that has been altered, as desired.

It should be noted that in the foregoing details the transmission regulating system in accordance with the invention has in each case been associated, for the sake of simplicity, with a (driving) primary shaft. It can just as easily be associated, however, with the (driven) secondary shaft. This inversion of the chain of force, needless to say, takes place in any case, when the working machine, normally, driven by the gearing, is braked by the said gearing, which is, of course, perfectly possible in those versions of the gearing according to the invention which are illustrated in FIGS. 1 and 2.

As mentioned farther back, the axially fixed pulley halves 18a and 20a in FIG. 1, for instance, are mounted by their periphery 22 and 24 respectively on substantially frustum-shaped rings 26 and 28. The advantage of this system resides, inter alia, in the fact that the pulley halves 18a and 20a are supported against each other via these rings 26 and 28, thus providing favourable static strength properties. A further advantage of this peripheral mounting system results in the effective damping of any rotary oscillations which may occur between the pulleys 18 and 20, in addition to which it enables the gearing to be constructed to a shorter length.

According to a further principle on which the invention is based, the belt contact surfaces of the pulleys, which may consist of light metal, are preferably coated with an abrasion-proof plastic, such as polyamide or tetrafluoro-ethylene, as indicated at 216.

A description has been given of the way in which five steplessly variable looping gearings in accordance with the present invention are mounted in parallel. A technician in this field will then have no difficulty in constructing a parallel connection of any desired number of pulley sets, e.g., three, four, six or more.

What I claim is:

1. A power transmission mechanism for the parallel connection of infinitely-adjustable pulleys with at least two belt pulleys mounted axially side by side on a common shaft comprising:
   at least two belt pulleys, each having at least one axially displaceable half which determines the effective pulley diameter;
   an equalizing mechanism comprising differential gearing means for automatically displacing said at least one displaceable half of a pulley to nullify any asynchronism occurring in the running of said pulley relative to the other of said at least two pulleys;
   said at least two belt pulleys being inter-connected via said gearing means coaxially in series with said shaft and being rotatable in relation to said shaft, and pairs of oppositely pitched screw threads operably connecting said displaceable pulley halves and said shaft for displacing said pulley halves whenever said pulleys commence to turn at different speeds.

2. The mechanism of claim 1, wherein said equalizing mechanism comprises differential and planetary gearings and said at least two belt pulleys are interconnected via said gearings coaxially in series with said shaft and are rotatable in relation to said shaft, whenever the number of said at least two pulleys is even, said pulleys are arranged in pairs, whenever the number of said pulleys is odd, said pulleys are arranged in pairs with an adjoining single.

3. The mechanism of claim 1, wherein said pulley halves are supported by their periphery.

4. The mechanism of claim 3, wherein whenever two adjacent pulleys are paired, said adjacent pulleys are mutually axially supported.

5. The mechanism of claim 2, further including a control mechanism comprising a control sleeve having one of said pairs of screw threads and being non-rotatably mounted on said shaft relative to said shaft and axially displaceable along said shaft.

6. The mechanism of claim 2, further including a control mechanism comprising a control sleeve having one of said pairs of screws threads and being rotatably mounted on said shaft relative to said shaft and being axially non-displaceable.

7. The mechanism of claim 1, further comprising
   an other shaft;
   at least two further pulleys on said other shaft; and
   at least two belts connecting said belt pulleys and said further pulleys, wherein each of said further pulleys having at least one axially displaceable half and a spring loading of said axially displaceable half of said further pulley.

8. The mechanism of claim 7, wherein two adjacent further pulleys are loaded by the same spring.

9. The mechanism of claim 1 wherein said equalizing mechanism is made of plastic and all sliding surfaces of said mechanism are coated with plastic.

10. The mechanism of claim 1 wherein the contact surfaces of said pulleys are coated with plastic.

11. The mechanism of claim 7, wherein the contact surfaces of said pulleys and said further pulleys are coated with plastic.

* * * * *